US008910357B2

(12) United States Patent
Spanos et al.

(10) Patent No.: US 8,910,357 B2
(45) Date of Patent: Dec. 16, 2014

(54) TOOL FOR REMOVING PINS FROM A GAS TURBINE CASING

(75) Inventors: Charles V. Spanos, Greenville, SC (US); Charles Van Buchan, Greer, SC (US); John William Herbold, Fountain Inn, SC (US)

(73) Assignee: General Electric Company, Schenectady, NY (US)

(*) Notice: Subject to any disclaimer, the term of this patent is extended or adjusted under 35 U.S.C. 154(b) by 862 days.

(21) Appl. No.: 13/116,397

(22) Filed: May 26, 2011

(65) Prior Publication Data

US 2012/0301291 A1 Nov. 29, 2012

(51) Int. Cl.
*B23P 19/04* (2006.01)
*F01D 5/00* (2006.01)

(52) U.S. Cl.
CPC ........... *F01D 5/005* (2013.01); *F05B 2260/301* (2013.01); *F05D 2230/70* (2013.01)
USPC ............................................... 29/255; 29/278

(58) Field of Classification Search
USPC ............. 269/24, 27, 32, 20; 29/270, 255, 278
See application file for complete search history.

(56) References Cited

U.S. PATENT DOCUMENTS

| | | | | |
|---|---|---|---|---|
| 5,161,788 | A * | 11/1992 | Guzzoni | 269/24 |
| 8,104,751 | B2 * | 1/2012 | Timtner et al. | 269/32 |
| 8,146,221 | B2 * | 4/2012 | Hung | 29/252 |
| 2004/0163229 | A1 * | 8/2004 | Janusz | 29/456 |
| 2012/0301291 | A1 * | 11/2012 | Spanos et al. | 415/214.1 |

* cited by examiner

*Primary Examiner* — Lee D Wilson
(74) *Attorney, Agent, or Firm* — Dority & Manning, PA

(57) ABSTRACT

A tool for removing a pin from a casing is disclosed. The tool may generally include a rod configured to be coupled to a portion of the pin, a sleeve received on the rod and a flange member received on the sleeve. The flange member may be received on the sleeve such that the flange member is movable in a radial direction relative to the sleeve. Additionally, the tool may include a collar configured to be radially engaged between the flange member and the rod when the flange member is moved radially outwardly relative to the sleeve.

15 Claims, 2 Drawing Sheets

TOOL FOR REMOVING PINS FROM A GAS TURBINE CASING

FIELD OF THE INVENTION

The present subject matter relates generally to a pin removal tool and, more particularly, to a tool for removing retaining pins from a gas turbine casing.

BACKGROUND OF THE INVENTION

Gas turbines typically include a compressor section, a combustion section, and a turbine section. The compressor section pressurizes air flowing into the turbine. The pressurized air discharged from the compressor section flows into the combustion section, which is generally characterized by a plurality of combustors disposed in an annular array about the axis of the engine. Air entering each combustor is mixed with fuel and combusted. Hot gases of combustion flow from the combustion liner through a transition piece to the turbine section to drive the turbine and generate power. The turbine section typically includes a turbine rotor having a plurality of rotor disks and a plurality of turbine buckets extending radially outwardly from and being coupled to each rotor disk for rotation therewith. The turbine buckets are generally designed to capture and convert the kinetic energy of the hot gases of combustion flowing through the turbine section into usable rotational energy.

The turbine section also includes a substantially cylindrical turbine casing configured to contain the hot gases of combustion. The turbine casing typically supports a turbine shroud designed to encase or shroud the rotating components of the turbine rotor. As is generally understood, the turbine shroud may be configured as a single component forming a continuous ring around the turbine rotor or may comprise a plurality of shroud sections or blocks that, when installed around the inner circumference of the turbine casing, abut one another so as generally define a cylindrical shape surrounding the turbine rotor. A cross-sectional view of one embodiment of a portion of a conventional turbine casing 10 and turbine shroud 12 is illustrated in FIG. 1. In general, the turbine shroud 12 may be configured to be supported around the inner circumference of the turbine casing 10 so that an inner surface 14 of the turbine shroud 12 may be disposed adjacent to the tips of the rotating buckets of the turbine rotor (not shown). For instance, as shown in the illustrated embodiment, a shroud fit 16 may project from an inner surface 18 of the turbine casing 10. In such an embodiment, the turbine shroud 12 may define a corresponding slot 20 having a size and/or shape generally corresponding to the size and/or shape of the shroud fit 16 so that the turbine shroud 12 may be installed onto the shroud fit 16 and, thus, may be radially supported against the inner surface 18 of the casing 10.

Additionally, a plurality of retaining pins 22 may be installed radially between the turbine casing 10 and the turbine shroud 12 to circumferentially and/or axially retain the turbine shroud 12 relative to the turbine casing 10. In particular, the turbine casing 10 may define a plurality of retaining holes 24 configured to be generally aligned with a plurality of corresponding retaining holes 26 defined in the turbine shroud 12. Thus, a retaining pin 22 may be radially inserted through one of the retaining holes 24 defined in the turbine casing 10 and may extend into the corresponding retaining hole 26 defined in the turbine shroud 12. As shown in FIG. 1, the dimensions of the retaining holes 24, 26 and/or the retaining pin 22 may be designed such that a radially outer end 30 of the retaining pin 22 is recessed relative to an outer surface 28 of the turbine casing 10 when the pin 22 is inserted into the retaining holes 24, 26. Additionally, a threaded opening 32 may be defined in the radially outer end 30 of the retaining pin 22.

It should be appreciated that, in one embodiment, the retaining holes 24 defined in the turbine casing 10 may include a counter-bore 34 configured to receive a portion of a plug (not shown) for plugging the retaining holes 24 during operation of the gas turbine.

During downtimes, it is often necessary to remove the retaining pins 22 from the turbine casing 10 to allow removal of the turbine shroud 12 and/or to permit other maintenance operations to be performed on the gas turbine. However, due to improper installation of the retaining pins 22 and/or wear and tear occurring during turbine operation, removal of the retaining pins 22 can be a very time and labor intensive process. For instance, the retaining pins 22 are often bent during installation and/or become damaged as a result of vibrations and/or relative movement occurring between the turbine casing 10 and the turbine shroud 12, thereby causing the retaining pins 22 to become stuck within the retaining holes 24, 26. Additionally, dirt and other debris may become trapped between the retaining pins 22 and the turbine casing 10 and/or the turbine shroud 10, thereby further increasing the difficulty of removing the pins 22.

Various methods are known for removing the retaining pins 22 from the turbine casing 10. However, it has been found that each of these conventional methods presents one or more disadvantages. For instance, one known method for removing the retaining pins 22 includes the use of small fasteners together with heavy-duty pliers. Specifically, a small fastener is typically screwed into the threaded opening 32 defined in each retaining pin 22. The pliers are then utilized to pull the fastener and retaining pin 22 out from the turbine casing 10. Another conventional method utilizes a slide-hammer-like device in order to transmit a radially outward force to the retaining pin 22. For instance, it is known to screw a threaded rod into the threaded opening 32 of a retaining pin 22 and attach a sliding weight onto the threaded rod to create a makeshift slide hammer that can be used to remove the retaining pins 22. However, due to the inconsistent nature of the force applied by these conventional methods and/or due to the design limitations built into the retaining pins 22, the fasteners and/or threaded rods used with these methods are prone to fatigue failure at the edge of the threaded openings 32 during the removal process. When this occurs, it is typically necessary to drill out the retaining pins 22 using suitable machining equipment, thereby further increasing the time and labor required to remove the pins 22.

Accordingly, a tool that can be used to quickly, easily and/or consistently remove retaining pins from a turbine casing would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a tool for removing a pin from a casing. The tool may generally include a rod configured to be coupled to a portion of the pin, a sleeve received on the rod and a flange member received on the sleeve. The flange member may be received on the sleeve such that the flange member is movable in a radial direction relative to the sleeve. Additionally, the tool may include a collar configured to be radially engaged between the flange member and the rod when the flange member is moved radially outwardly relative to the sleeve.

In another aspect, the present subject matter discloses a system including a casing and a pin extending radially within the casing. The system may also include a rod coupled to a portion of the pin, a sleeve received on the rod and a flange member received on the sleeve. The flange member may be received on the sleeve such that the flange member is movable in a radial direction relative to the sleeve. Additionally, the system may include a collar configured to be radially engaged between the flange member and the rod when the flange member is moved radially outwardly relative to the sleeve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
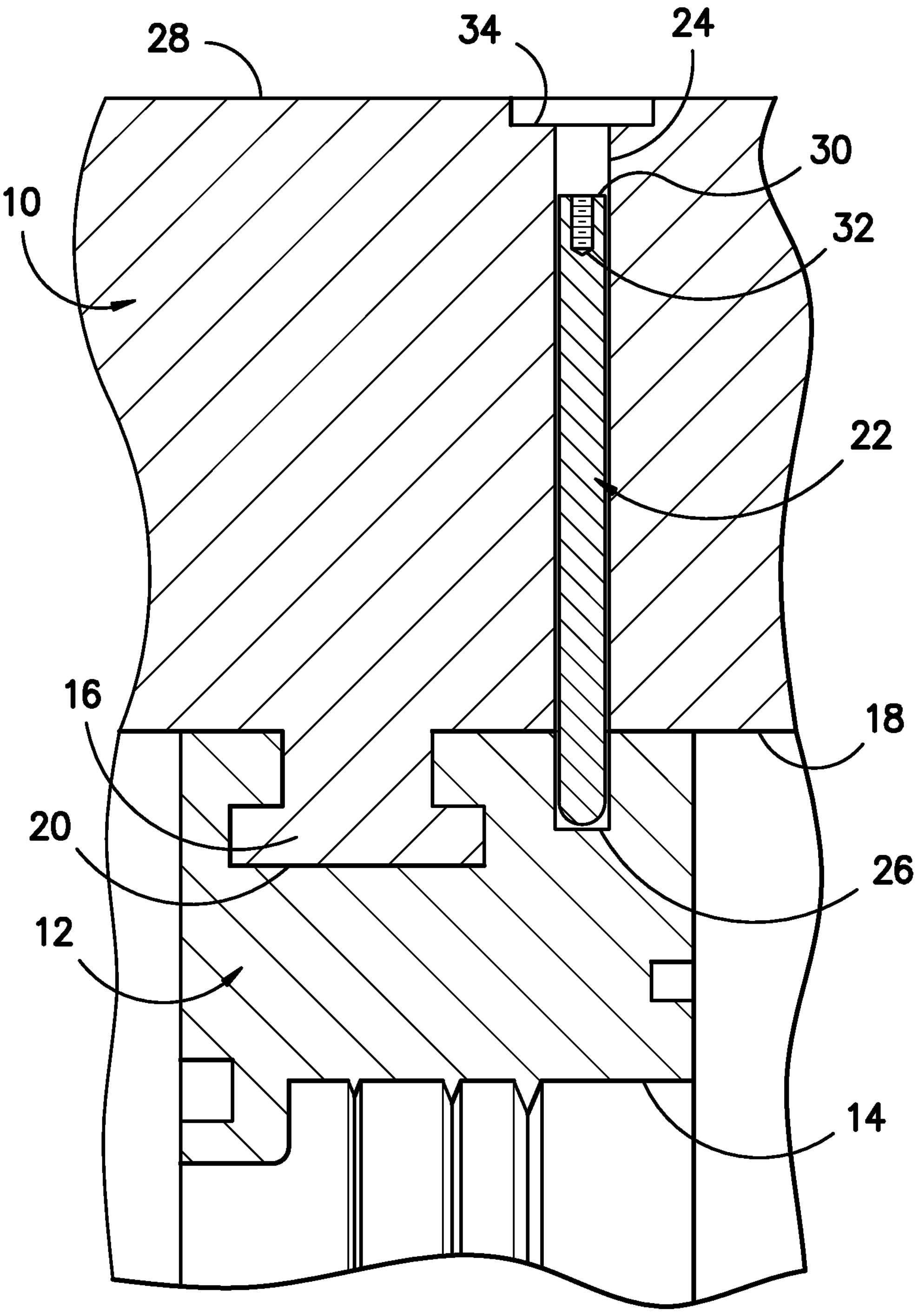
FIG. -1- ( PRIOR ART )
FIG. 1 illustrates a partial, cross-sectional view of a conventional turbine casing and turbine shroud, particularly illustrating a retaining pin extending radially between the turbine casing and the turbine shroud.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to a removal tool for removing retaining pins from a casing. As will be described below, the removal tool may generally allow for a consistent, radially outward force to be easily and efficiently applied against the retaining pin in order to pull the pin from the casing. Additionally, in several embodiments, the removal tool may be tightly secured against the retaining pin, thereby reducing the likelihood that a portion of the tool breaks off within the pin during the removal process.

In general, the removal tool disclosed herein will be described in the context of removing retaining pins 22 from a gas turbine casing 10 (FIG. 1). However, it should be appreciated by those of ordinary skill that the removal tool may also be utilized to remove retaining pins and/or any other suitable pins from casings of differing equipment and/or from any other structure in which pins may be located.

Figure 2:
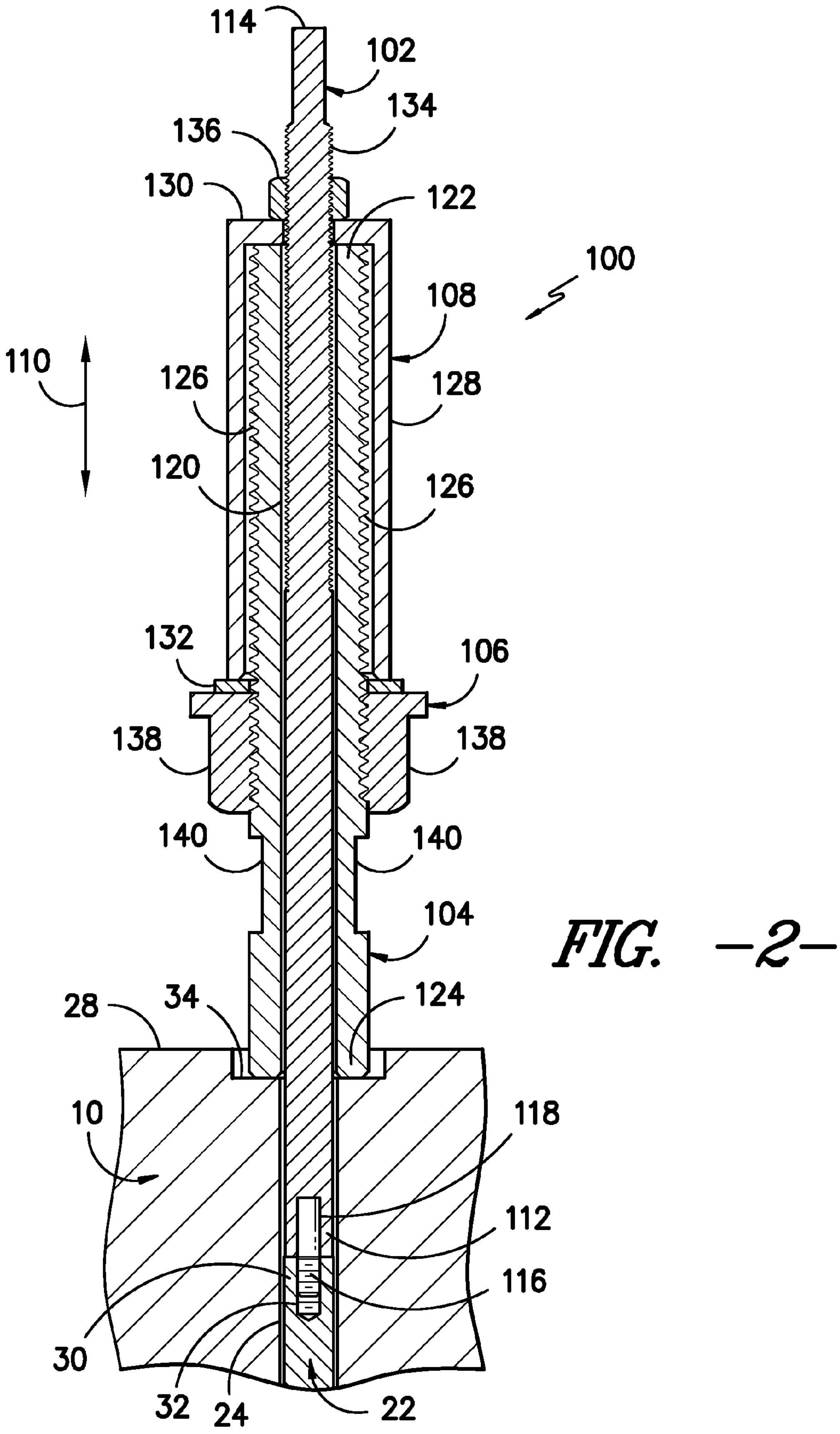
FIG. 2 illustrates a cross-sectional view of one embodiment of a tool for removing retaining pins from a casing in accordance with aspects of the present subject matter.

Referring now to FIG. 2, there is illustrated a cross-sectional view of one embodiment of a removal tool 100 that may be utilized to remove retaining pins 22 from the casing 10 of a gas turbine. As shown, the removal tool 100 generally comprises an assembly of different components. For instance, in several embodiments, the removal tool 100 may include a rod 102 configured to be coupled to a portion of the retaining pin 22, a sleeve 104 received on the rod 102 and a flange member 106 received on the sleeve 104. The flange member 106 may generally be received in the sleeve 104 such that it is movable in a radial direction (indicated by arrow 110) relative to the sleeve 104. Additionally, the removal tool 100 may include a collar 108 configured to be radially engaged against both the flange member 106 and a portion of the rod 102. As such, when the flange member 106 is moved radially outwardly relative to the sleeve 104, a radial force may be transmitted through the collar 108 and into the rod 102, thereby pushing the rod 102 radially outwardly and pulling the retaining pin 22 out from within the retaining hole 24 defined in the turbine casing 10.

The rod 102 of the removal tool 100 may generally comprise an elongated member extending between a first end 112 and a second end 114. In general, the first and/or second end 112, 114 of the rod 102 may be configured to be attached and/or otherwise coupled to the radially outer end 30 of the retaining pin. 22 For example, in several embodiments, the rod 102 may include a threaded projection 116 extending outwardly from its first end 112. In such embodiments, the threaded projection 116 may generally be configured to be received within the threaded opening 32 defined in the retaining pin 22. For instance, the threaded projection 116 may have a radial length that is generally equal to or less than the radial length of the threaded opening 32. Thus, as shown in FIG. 2, in one embodiment, the threaded projection 116 may be screwed tightly within the threaded opening 32 until the first end 112 of the rod 102 is engaged against the radially outer end 30 of the retaining pin 22. Such engagement between the first end 112 of the rod 102 and the retaining pin 22 may generally prevent the threaded projection 116 from bending laterally, thereby decreasing the likelihood that the threaded projection 116 will break off within the threaded opening 32 during the removal process.

It should be appreciated that, in several embodiments, the threaded projection 116 may comprise an integral portion of the rod 102 or a separate component configured to be separately attached to the rod 102. For instance, in one embodiment, the threaded projection 116 may be formed integrally with the rod 102, such as by machining the threaded projection out of a portion of the rod 102. In another embodiment, the threaded projection 116 may comprise a threaded fastener (e.g., a high strength fastener and/or any other suitable fastener) configured to be mounted to and/or otherwise attached to the first end 112 of the rod 102. For example, the threaded projection 116 may be pressed into and/or attached within a corresponding opening 118 defined through the first end 112 of the rod 102 and/or may be attached to the rod 102 using any other suitable means known in the art (e.g., by welding the threaded projection 116 to the first end 112).

It should also be appreciated that, in embodiments in which the retaining pin 22 is recessed within the retaining hole 24 defined in the turbine casing 10 (as shown in FIGS. 1 and 2), the size and/or shape of the rod 102 may generally be chosen such that at least a portion of the rod 102 (e.g., the first end 112 of the rod 102) may be inserted within the retaining hole 24. For instance, as shown in FIG. 2, the first end 112 of the rod 102 may be sized and/or shaped similarly to the size and/or shape of the retaining pin 22, such as by having a generally cylindrical shape and/or by defining a diameter generally equal to the diameter of the retaining pin 22.

Additionally, in alternative embodiments, the rod 102 may be configured to be coupled to the radially outer end 30 of the retaining pin 22 using any other suitable attachment method known the art. For instance, in one embodiment, the first or second end 112, 114 of the rod 102 may be welded to the radially outer end 30 of the retaining pin 22.

Referring still to FIG. 2, the sleeve 104 of the removal tool 100 may generally be configured to be received onto at least a portion of the rod 102. For instance, in several embodiments, the sleeve 104 may have a hollow or tubular configuration and may define a through-passage 120 extending along the entire radial length of the sleeve 104 (i.e., from a top end 122 of the sleeve 104 to a bottom end 124 of the sleeve 104). In general, the through-passage 122 may have any suitable size and/or shape that permits the sleeve 104 to be received on the rod 102. For example, as shown in FIG. 2, the through passage 122 may have a size and/or shape generally corresponding to the size and/or shape of the rod 102 such that a loose, sliding fit is defined between the sleeve 104 and the rod 102. As such, the sleeve 104 may be installed into the rod 102 at one end (e.g., the second end 114 of the rod 102) and subsequently slid and/or otherwise moved into place.

Additionally, as indicated above, the flange member 106 may generally be configured to be received on the sleeve 104 such that the flange member 106 is movable in a radial direction relative to the sleeve 104. For instance, in several embodiments, the flange member 106 may comprise a nut (e.g., a flange nut) or any other suitable threaded member configured to be screwed onto a portion of the sleeve 104. Specifically, as shown in FIG. 2, at least a portion of an outer surface 126 of the sleeve 104 may be threaded. As such, the flange member 106 may be in threaded engagement with the sleeve 104 and, thus, may be moved radially outwardly along the sleeve 104 by rotating the flange member 106 relative to the sleeve 104 in one direction and radially inwardly along the sleeve 104 by rotating the flange member 106 relative to the sleeve 104 in the other direction.

It should be appreciated that, in alternative embodiments, the flange member 106 need not be configured as a nut or other suitable threaded member, but may generally comprise any suitable component capable of being displaced radially along the sleeve 104. For instance, in one embodiment, the flange member 106 may simply comprise a tubular shaped member configured to be in sliding engagement with the sleeve 104. As such, the flange member 106 may be displaced radially along the sleeve 104 by simply pulling and/or pushing the flange member 106 between the top and bottom ends 122, 124. In another embodiment, the sleeve 104 may define a track or groove into which a portion of the flange member 106 (e.g., a corresponding tongue and/or projection) may be received. As such, the flange member 106 may be moved radially along the sleeve 104 by displacing the flange member 106 along the track or groove.

It should also be appreciated that, in embodiments in which the flange member 106 is not in threaded engagement with the sleeve 104, the flange member 106 may be moved radially along the sleeve 104 using any suitable means known in the art. For instance, in one embodiment, the flange member 106 may be moved relative to the sleeve 104 manually, such as by pushing/pulling the flange member 106 by hand and/or by using a suitable tool (e.g., a hammer) to move the flange member 106 radially relative to the sleeve 104. In another embodiment, a cylinder (e.g., a hydraulic, pneumatic or other suitable cylinder) may be coupled to the flange member 106 to facilitate relative radial motion between the sleeve 104 and the flange member 106. In a further embodiment, the flange member 106 may be coupled to any other suitable linear displacement mechanism (e.g., a rack and pinion, a worm gear driven device, a cam actuated device, an electro-magnetic solenoid or motor) that may be used to displace the flange member 106 relative to the sleeve 104.

Referring still to FIG. 2, as indicated above, the collar 108 of the removal tool 100 may generally be configured to be radially engaged between the flange member 106 and a portion of the rod 102 so that radial forces (generated by the radially outward movement of the flange member 106 relative to the sleeve 104) may be transmitted through the collar 108 and into the rod 102. Thus, in several embodiments, a first portion 128 of the collar 108 may generally be configured to be radially engaged against the flange member 106 and a second portion 130 of the collar 108 may generally be configured to be radially engage against a portion of the rod 102. For instance, as shown in FIG. 2, in one embodiment, the collar 108 may be configured to be received on the second end 114 of the rod 102 and positioned over the top end 122 of the sleeve 104 so that the first portion 128 of the collar 108 generally extends radially between the flange member 106 and the top end 122 of the sleeve 104 and the second portion 130 of the collar 108 extends circumferentially around the rod 102 at a location generally adjacent to the top end 122 of the sleeve 104.

It should be appreciated that the collar 108 may be configured to be directly and/or indirectly engaged against the flange member 106. For instance, in one embodiment, the first portion 128 of the collar 108 may configured to be in direct radial contact with the flange member 106 as it is moved radially along the sleeve 104, such as by being attached to a portion of the flange member 106 or by being in abutting engagement with a portion of the flange member 106. Alternatively, as shown in FIG. 2, a spacer 132 or other suitable component (e.g., a thrust washer) may be disposed between the first portion 128 of the collar 108 and the flange member 106 such that any radial force applied by the flange member 106 may be transmitted through the spacer 132 and into the collar 108.

Similarly, it should be appreciated that the collar 108 may also be configured to be directly and/or indirectly engaged against the rod 102. For example, in one embodiment, the second portion 130 of the collar 108 may be configured to be in direct radial contact with the rod 102 as the flange member 106 is moved radially relative to the sleeve 104, such as by being attached to a portion of the rod 102 or by being in abutting engagement with a portion of the rod 102. Alternatively, the second portion 130 of the collar 108 may be in indirect radial contact with the rod 102. For instance, as shown in FIG. 2, at least a portion of the outer surface 134 of the rod 102 may be threaded so as to receive an attachment nut 136 and/or any suitable threaded member thereon. In such an embodiment, the attachment nut 136 may be screwed onto the rod 102 until the nut 136 contacts the second portion 130 of the collar 108, thereby facilitating radial engagement between the collar 108 and the rod 102.

To utilize the removal tool 100 shown in FIG. 2, in several embodiments, the rod 102 may be initially coupled to the retaining pin 22 by screwing the threaded projection 116 into the corresponding threaded opening 32. The sleeve 104, flange member 106 and collar 108 may then be placed onto the rod 102. For instance, in one embodiment, the sleeve 104, with the flange member 106 installed thereon, may be installed onto the second end 114 of the rod 102 and moved radially inwardly along the rod 102 until the bottom end 124 of the sleeve 104 contacts and/or is engaged against the outer surface 28 of the turbine casing 10 (e.g., within the counterbore 34 of the retaining hole 22). The collar 108 (and spacer 132) may then be installed onto the second end 114 of the rod 102 and displaced along the rod 102 and/or sleeve 104 until the first portion 128 of the collar 108 radially engages the flange member 106. The attachment nut 136 may then be screwed onto the rod 102 until the nut 136 engages the second portion 130 of the collar 108.

Once installed, to remove the retaining pin 22 from the turbine casing 10, the flange member 106 is moved radially outwardly along the sleeve 104. For instance, in the illustrated embodiment, the flange member 106 may be rotated relative to the sleeve 104 to permit relative radial movement between the flange member 106 and the sleeve 104. In such an embodiment, it may be desirable that the flange member 106 include one or more flattened sections 138 defined around its outer perimeter (e.g., by configuring the flange member 106 as a nut) and/or that the sleeve 104 include one or more flattened sections 140 defined around its outer perimeter to facilitate rotating the flange member 106 relative to the sleeve 104. For instance, the flattened sections 138, 140 may allow a maintenance worker to utilize one or more wrenches or other suitable tools to prevent the sleeve 104 from rotating while the flange member 106 is being rotated.

As the flange member 106 is moved radially outwardly along the sleeve 104, it applies a radial force against the collar 108 as the bottom end 124 of the sleeve 104 reacts against the turbine casing 10. This radial force may then be transmitted from the collar 108, through the attachment nut 136, and into the rod 102, thereby pushing the rod 102 radially outwardly relative to the sleeve 104 and pulling the retaining pin 22 radially outwardly from the turbine casing 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for removing a pin, the tool comprising:

a rod configured to be coupled to a portion of the pin, wherein at least a portion of an outer surface of said rod is the threaded;

a sleeve received on said rod;

a flange member received on said sleeve such that said flange member is movable in a radial direction relative to said sleeve;

a collar configured to be radially engaged between said flange member and said rod when said flange member is moved radially outwardly relative to said sleeve; and an attachment nut in threaded engagement with said outer surface, said collar radially engaging said attachment nut when said flange member is moved radially outwardly relative to said sleeve.

2. The tool of claim 1, wherein said flange member is configured to apply a radial force against said collar when said flange member is moved radially outwardly relative to said sleeve, the radial force being transmitted through said collar and into said rod.

3. The tool of claim 1, wherein at least a portion of an outer surface of said sleeve is threaded.

4. The tool of claim 3, wherein said flange member comprises a threaded nut, said threaded nut being in threaded engagement with said outer surface.

5. The tool of claim 1, wherein said rod includes a threaded projection, said threaded projection being coupled to said portion of said pin.

6. The tool of claim 1, wherein an outer perimeter of at least one of said sleeve and said flange member defines a flattened section.

7. The tool of claim 1, wherein said collar includes a first portion and a second portion, said first portion extending radially between said flange member and a top end of said sleeve, said second portion extending circumferentially around said rod.

8. A system comprising:

a casing;

a pin extending radially within said casing;

a rod coupled to a portion of said pin, wherein at least a portion of an outer surface of said rod is the threaded;

a sleeve received on said rod;

a flange member received on said sleeve such that said flange member is movable in a radial direction relative to said sleeve;

a collar configured to be radially engaged between said flange member and said rod when said flange member is moved radially outwardly relative to said sleeve; and an attachment nut in threaded engagement with said outer surface, said collar radially engaging said attachment nut when said flange member is moved radially outwardly relative to said sleeve.

9. The system of claim 8, wherein said casing comprises a turbine casing.

10. The system of claim 8, wherein said sleeve includes a bottom end, said bottom end being configured to be radially engaged against a portion of said casing.

11. The system of claim 8, wherein said rod includes a threaded projection and said pin defines a threaded opening, said threaded projection being in threaded engagement with said threaded opening.

12. The system of claim 8, wherein said flange member is configured to apply a radial force against said collar when said flange member is moved radially outwardly relative to said sleeve, the radial force being transmitted through said collar to said rod.

13. The system of claim 8, wherein said flange member comprises a threaded nut, said threaded nut being in threaded engagement with said outer surface.

14. The system of claim 8, wherein an outer perimeter of at least one of said sleeve and said flange member defines a flattened section.

15. The system of claim 8, wherein said collar includes a first portion and a second portion, said first portion extending radially between said flange member and a top end of said sleeve, said second portion extending circumferentially around said rod.

* * * * *

UNITED STATES PATENT AND TRADEMARK OFFICE

CERTIFICATE OF CORRECTION

PATENT NO. : 8,910,357 B2
APPLICATION NO. : 13/116397
DATED : December 16, 2014
INVENTOR(S) : Spanos et al.

It is certified that error appears in the above-identified patent and that said Letters Patent is hereby corrected as shown below:

In the Specification,

In Column 5, Line 16, delete "through-passage 122" and insert -- through-passage 120 --, therefor.

In Column 5, Line 19, delete "passage 122" and insert -- passage 120 --, therefor.

Signed and Sealed this
Fifth Day of May, 2015

Michelle K. Lee

*Director of the United States Patent and Trademark Office*